United States Patent
Yamazaki

[19]
[11] Patent Number: 6,094,241
[45] Date of Patent: Jul. 25, 2000

[54] COMPOSITE DISPLAY APPARATUS USING AN LCD, OPTICAL PATH SEPARATOR, AND CCD

[75] Inventor: Shoichi Yamazaki, Yokohama, Japan

[73] Assignee: Mixed Reality Systems Laboratory, Inc., Yokohama, Japan

[21] Appl. No.: 09/141,348

[22] Filed: Aug. 27, 1998

[30] Foreign Application Priority Data

Dec. 10, 1997 [JP] Japan .................................. 9-361957

[51] Int. Cl.[7] .......................... G02F 1/1335; G02B 27/14
[52] U.S. Cl. .............................. 349/11; 359/629; 359/630
[58] Field of Search .............................. 349/11; 359/629, 359/630, 632

[56] References Cited

U.S. PATENT DOCUMENTS

| | | | |
|---|---|---|---|
| 3,666,346 | 5/1972 | Lucas | ........................................ 359/630 |
| 4,851,902 | 7/1989 | Tezuka et al. | . |
| 5,106,179 | 4/1992 | Kamaya et al. | . |
| 5,200,844 | 4/1993 | Suvada | . |
| 5,530,586 | 6/1996 | Yasugaki | ................................ 359/630 |

FOREIGN PATENT DOCUMENTS

| | | |
|---|---|---|
| 0 007 039 | 1/1980 | European Pat. Off. ................ 359/630 |
| 0583116 | 2/1994 | European Pat. Off. . |
| 62-258574 | 11/1987 | Japan . |
| WO94/01798 | 1/1994 | WIPO . |

*Primary Examiner*—Walter Malinowski
*Attorney, Agent, or Firm*—Fitzpatrick, Cella, Harper & Scinto

[57] ABSTRACT

The present invention relates to a compact, composite display apparatus capable of simultaneously establishing a display optical system and an image-pickup optical system or a seethrough optical system without parallax, which has the following structure. The apparatus comprises a display optical system for guiding a light beam from a display device displaying image information, to an eyeball of an observer and an image-pickup optical system for focusing a light beam from the outside on an image pickup device, wherein an optical path separator provided in an optical path is arranged to substantially align an eyeball optic axis of the light beam incident from the display optical system to the eyeball of the observer or a virtual eyeball optic axis as an extension on the outside of the eyeball optic axis with an outside optic axis of the light beam incident from the outside of the image-pickup optical system, the apparatus having a shield device for preventing the light beam from the display device from entering the image pickup device of the image-pickup optical system.

17 Claims, 9 Drawing Sheets

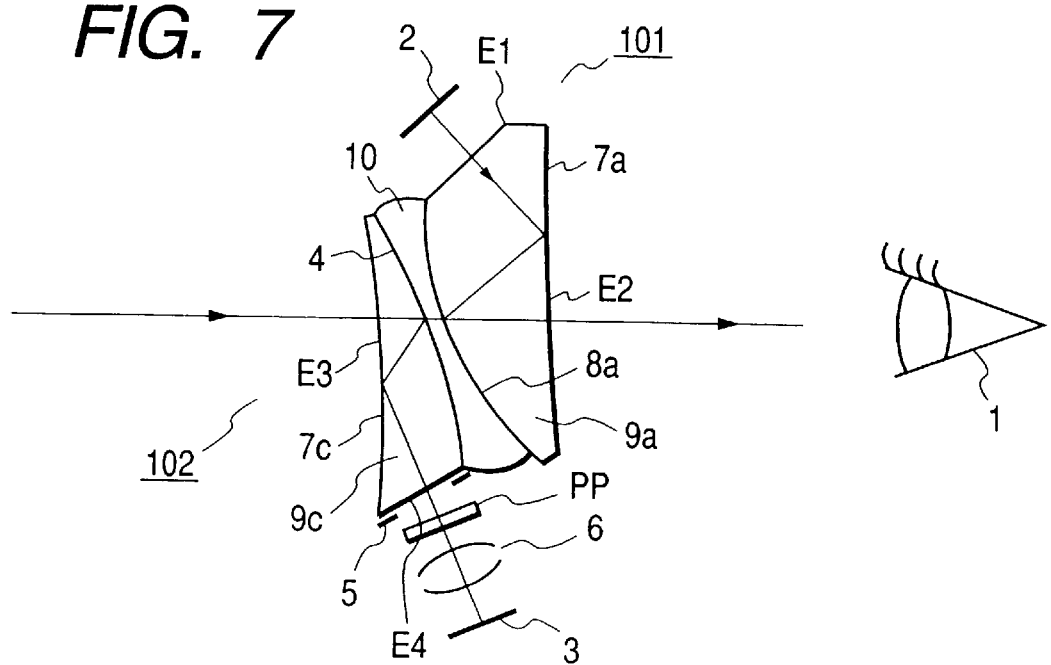
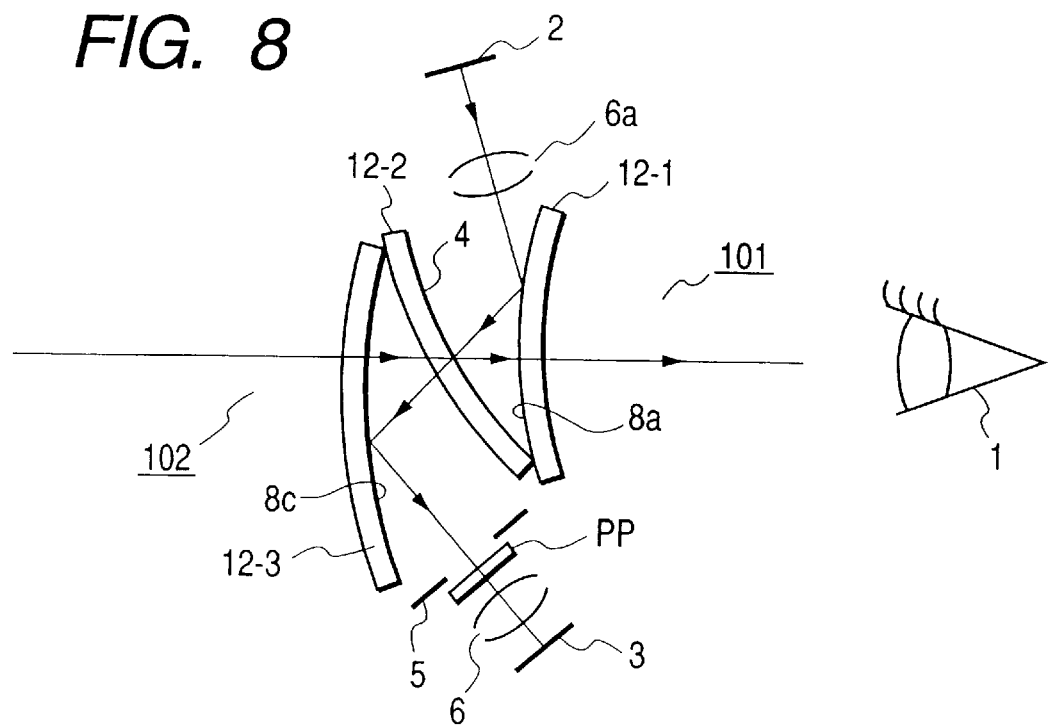

0"

(1/60)"

(1/60)"

(1/60+1/60)" = (1/30)"

FIG. 11A   R
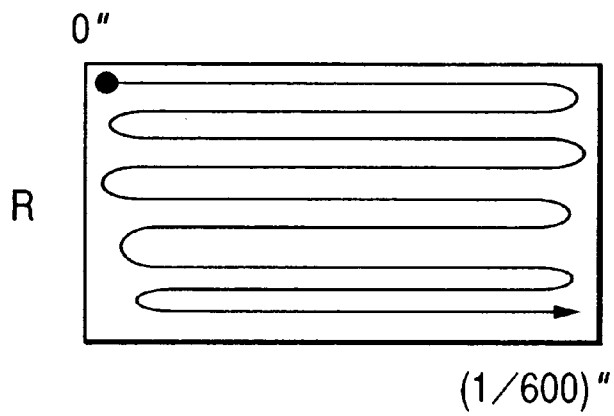
FIG. 11B   G
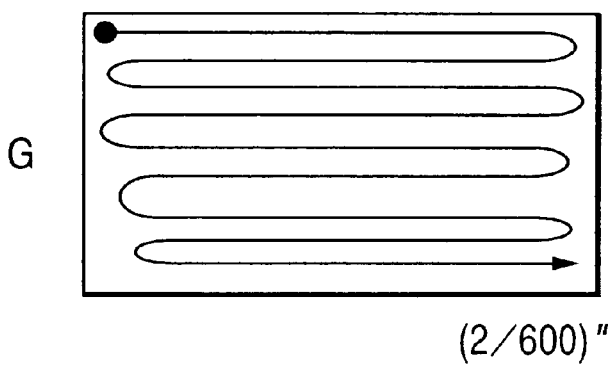
FIG. 11C   B
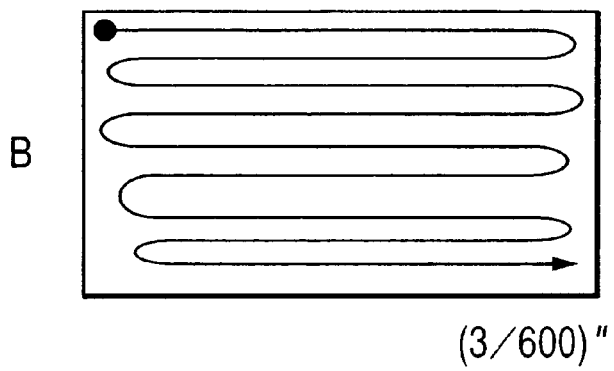

COMPOSITE DISPLAY APPARATUS USING AN LCD, OPTICAL PATH SEPARATOR, AND CCD

BACKGROUND OF THE INVENTION

1. Field of the Invention

The present invention relates to a composite display apparatus achieved by miniaturizing the whole apparatus having an image-pickup optical system for capturing light from image information of the outside to form an image on an image pickup device and a display optical system for observation of image information displayed on a display device such as a liquid crystal display. More particularly, the invention is suitably applicable to apparatus called a head-mounted display (HMD) and a goggle type display.

2. Related Background Art

There have been suggested heretofore apparatus in which a small CCD camera is mounted on the HMD and which is arranged to display image information obtained through the small CCD camera on the HMD as it is, and apparatus for processing the image information obtained through the small CCD camera to convert the information to some image information to display it on the HMD. Further, a variety of suggestions have been made heretofore as to a seethrough type HMD (which is an HMD in the structure capable of directly observing light from the outside at the angular magnification 1) among the HMDs.

The HMD of this type will have a parallax if there is a difference between the eyeball optic axis of the display optical system for observation of image information displayed on the display device of HMD and the optic axis of the CCD camera (the image-pickup optical system) for imaging the image information of the outside on the CCD surface. Devices having both the image-pickup optical system and the display optical system without a parallax are suggested in Japanese Laid-open Patent Applications No. 4-22358 and No. 5-303053.

In the display optical system proposed in Japanese Laid-open Patent Application No. 4-22358, light emitted from a small liquid crystal display travels via a flat half mirror to be guided to the eyeball by an eyepiece. On the other hand, the image-pickup optical system is so arranged that the light from the outside travels via the flat half mirror to be focused on the small camera. Since this flat half mirror was located at 45°, the apparatus tended to become large. In addition, because there is the eyepiece in front of the eyeball, the seethrough optical system cannot be established.

Japanese Laid-open Patent Application No. 5-303053 discloses a configuration capable of establishing the seethrough optical system, but there was such a tendency that the optical system was complex and the apparatus became very large.

The parallax will appear if there is a difference between the eyeball optic axis of the display optical system for observation of the image information displayed on the display device of HMD and the image-pickup optic axis of the image-pickup optical system (CCD camera) for focusing the image information of the outside on the CCD surface. When the half mirror is used to align the optic axes of the both image-pickup optical system and display optical system with each other in order to eliminate this parallax, part of the light from the display device passes through the half mirror to be incident onto the CCD surface of the image-pickup optical system in some cases. The light from the display device, if mixed with the image information from the outside formed on the CCD surface, becomes flare (noise), thus becoming a cause of degrading the quality of image information of the outside.

There are the following demands for the composite display apparatus such as the HMD as described above; the whole apparatus is so compact and lightweight as to be mounted on the head part of an observer, the quality of images by the display optical system and the image-pickup optical system is high enough, no parallax occurs, and the seethrough optical system can be established.

SUMMARY OF THE INVENTION

An object of the present invention is to provide a composite display apparatus capable of preventing a light beam from a display device such as a liquid crystal display (LCD) from being incident to the image pickup surface of the image-pickup optical system while miniaturizing the whole apparatus and capable of observing and forming the image information from the two systems in good condition without a parallax, by properly setting the structure of the display optical system having a plurality of eccentric, reflective surfaces for guiding the light beam from the display device to the eyeball of an observer and the structure of the image-pickup optical system for focusing the image information of the outside onto the surface of the image pickup device such as CCD.

The composite display apparatus of the present invention has the following structure as means for solving the problem.

(1-1) The apparatus has a display optical system for guiding a light beam from display means displaying image information, to an eyeball of an observer, and an image-pickup optical system for focusing a light beam from the outside on an image pickup device, wherein optical path separating means provided in an optical path is arranged to substantially align an eyeball optic axis of a light beam incident from the display optical system to the eyeball of the observer or a virtual eyeball optic axis as an extension of the eyeball optic axis with an outside optic axis of a light beam incident from the outside of the image-pickup optical system, and shield means for preventing the light beam from the display means from entering the image pickup device of the image-pickup optical system.

(1-2) The apparatus has a display optical system having a plurality of reflective surfaces for guiding a light beam from display means displaying image information, to an eyeball of an observer, and an image-pickup optical system having a plurality of reflective surfaces for focusing a light beam from the outside on an image pickup device, wherein optical path separating means provided in an optical path is arranged to substantially align an eyeball optic axis of a light beam incident from the display optical system to the eyeball of the observer or a virtual eyeball optic axis as an extension on the outside of the eyeball optic axis with an outside optic axis of a light beam incident from the outside of the image-pickup optical system, and shield means for preventing the light beam from the display means from entering the image pickup device of the image-pickup optical system.

Particularly, the apparatus, in the structure (1-1) or in the structure (1-2), may have the following features.

(1-1-1) The optical path separating means is comprised of a reflective surface or a half mirror surface having an eccentric curvature.

(1-1-2) The display means is comprised of a liquid crystal display (LCD), and the shield means is comprised of a polarizing plate and is provided in front of the image pickup device.

(1-1-3) The display means displays color image information and the display means is illuminated on a time-division basis by a plurality of color light beams from respective light sources.

(1-1-4) The shield means is comprised of a color filter that does not transmit the plurality of color light beams from the light sources but transmits the other color light beams.

(1-1-5) The display means is comprised of a color liquid crystal display (color LCD) and the color liquid crystal display is illuminated by back light.

(1-1-6) The shield means is comprised of a color filter that does not transmit a plurality of color light beams from the color liquid crystal display but transmits the other light beams.

(1-1-7) The image-pickup optical system and the display optical system are separated as optical paths in opposite directions by the optical path separating means, the display optical system includes a reflective surface on one side of a reflective surface of the optical path separating means, and the image-pickup optical system includes a reflective surface on the other side of the reflective surface of the optical path separating means.

(1-1-8) The optical path separating means is comprised of a surface having transmitting action and reflecting action, and a seethrough optical system for observing image information of the outside is established in such a manner that a light beam from the outside passes through a part of the image-pickup optical system, passes through the optical path separating means, and passes through a part of the display optical system to be guided to the eyeball of the observer.

(1-3) The apparatus has a display optical system for guiding a light beam from display means displaying image information, to an eyeball of an observer, and an image-pickup optical system for focusing a light beam from the outside on an image pickup device, wherein optical path separating means provided in an optical path is arranged to substantially align an eyeball optic axis of a light beam incident from the display optical system to the eyeball of the observer or a virtual eyeball optic axis as an extension on the outside of the eyeball optic axis with an outside optic axis of a light beam incident from the outside of the image-pickup optical system, the display means displays the image information on a time-division basis, and the image pickup device records image information from the outside only during a period in which the display means does not display the image information.

(1-4) The apparatus has a display optical system having a plurality of reflective surfaces for guiding a light beam from display means displaying image information, to an eyeball of an observer, and an image-pickup optical system having a plurality of reflective surfaces for focusing a light beam from the outside on an image pickup device, wherein optical path separating means provided in an optical path is arranged to substantially align an eyeball optic axis of a light beam incident from the display optical system to the eyeball of the observer or a virtual eyeball optic axis as an extension on the outside of the eyeball optic axis with an outside optic axis of a light beam incident from the outside of the image-pickup optical system, the display means displays the image information on a time-division basis, and the image pickup device records the image information from the outside only during a period in which the display means does not display the image information.

BRIEF DESCRIPTION OF THE DRAWINGS

FIG. 7 is a major-part schematic diagram of Embodiment 6 of the present invention;

FIG. 8 is a major-part schematic diagram of Embodiment 7 of the present invention;

FIGS. 11A, 11B, and 11C are explanatory drawings for explaining a display method of the display device according to the present invention.

DETAILED DESCRIPTION OF THE PREFERRED EMBODIMENTS

Figure 1:
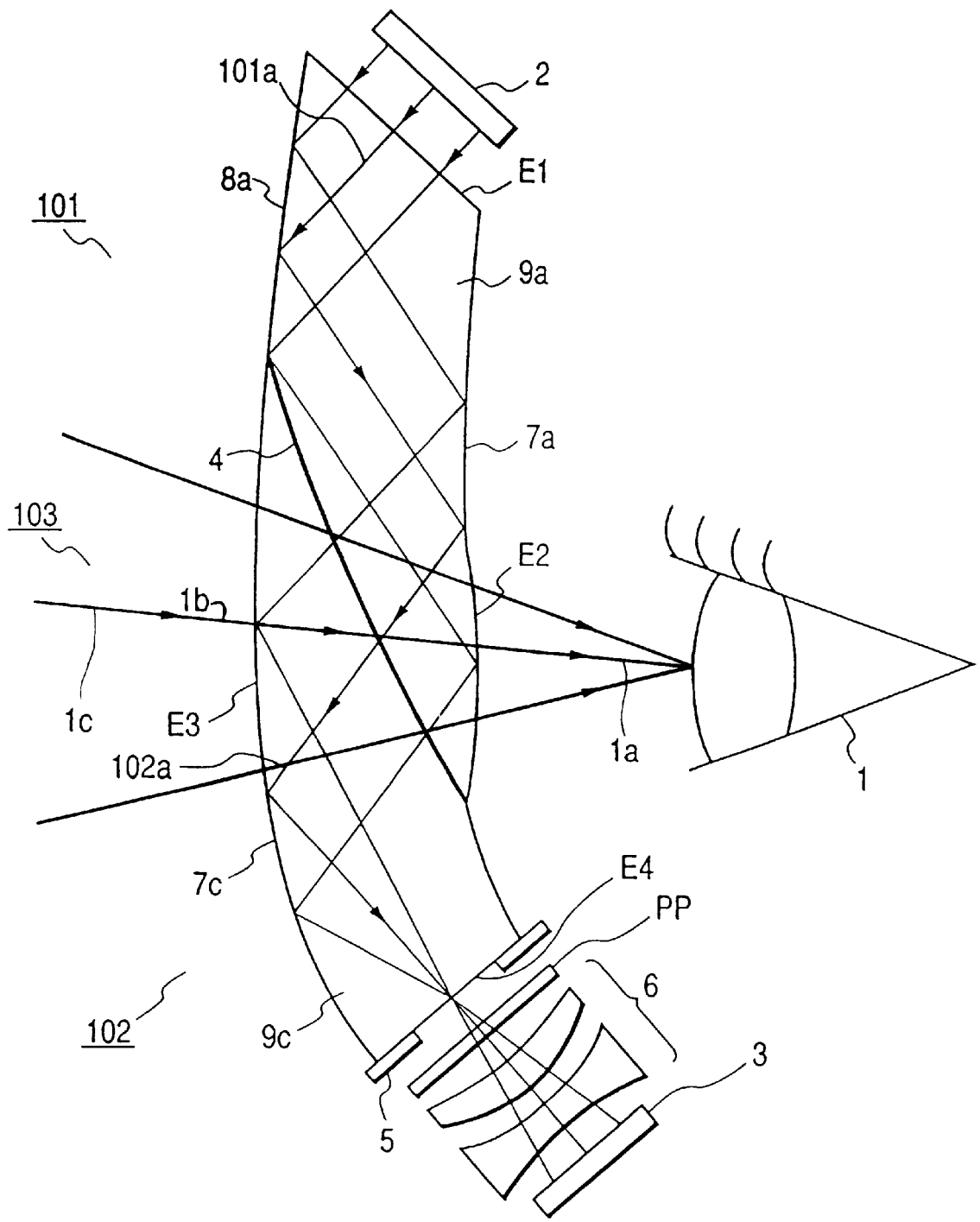
FIG. 1 is a major-part schematic diagram of Embodiment 1 of the present invention.

FIG. 1 is a schematic diagram of major part of Embodiment 1 of the composite display apparatus according to the present invention. In the same figure reference numeral 101 designates a display optical system (LCD display optical system), which has a plurality of eccentric, reflective surfaces having respective eccentric curvatures and which guides image information displayed on a liquid crystal display (LCD) 2 as a display means to the eyeball 1 of the observer. Numeral 101a denotes the optic axis of the display optical system 101. Numeral 102 represents an image-pickup optical system (CCD imaging optical system), which has a plurality of eccentric, reflective surfaces having respective eccentric curvatures and which images the image information of the outside on an image pickup device (CCD) 3. Numeral 102a indicates the optic axis of the image-pickup optical system.

In the present embodiment the both of display optical system 101 and image-pickup optical system 102 are made of a prism body 9a, 9c utilizing a plurality of internal reflections. The two prism bodies 9a, 9c are bonded to each other at an optical path separator 4 described below. The optical path separator 4 is comprised of a reflective surface having an eccentric curvature, which is a surface for separating the optical path from the display optical system 101 from the optical path of the image-pickup optical system 102. The optical path separator 4 is comprised of the eccentric, reflective surface, in which the display optical system 101 uses the reflective surface on one side while the image-pickup optical system 102 uses the reflective surface on the other side.

Light from the image information displayed on the LCD 2 is emergent in the form of linearly polarized light. PP represents a polarizing plate, an axis of polarization of which is set in a direction perpendicular to the polarization axis of the linearly polarized light emitted from the LCD 2. This prevents the linearly polarized light coming from the LCD 2 through the optical path separator 4 and prism body 9c from entering the CCD 3 via an optical system 6. Numeral 5 denotes a stop. Numeral 6 designates an optical system which images the image of the outside incident through the prism body 9c, on the surface of the CCD 3.

For also establishing a seethrough optical system 103 for guiding the image information of the outside to the eyeball 1 to permit the observer to observe it as being superimposed on the image information displayed on the display 2 or for permitting the observer to observe only the image information of the outside, the reflective surface of the optical path separator 4 is comprised of a half mirror (the half mirror in the present embodiment may have an arbitrary ratio of transmittance and reflectance, including the ratio of transmittance 50% and reflectance 50%) and materials for the prism bodies 9a, 9c of the two optical systems 101, 102 have a common index of refraction. Symbol 1c denotes the optic axis of the seethrough optical system 103 (the outside optic axis).

In the present embodiment the optic axis 101a of the display optical system 101, the optic axis 102a of the image-pickup optical system 102, and the optic axis 1c of the seethrough optical system 103 meet on the optical path separator 4, and they are aligned with the eyeball optic axis 1a.

In the present embodiment the elements are set as described above, thereby obtaining a compact optical system. In the present embodiment the eccentric, reflective surfaces are adapted to have their refractive powers varying depending upon azimuth angles about the vertex of each surface, so as to maintain good optical performance.

Each of the elements of FIG. 1 will be described below. The display optical system 101 is constructed so that the light from the LCD (display device) 2 is incident to an entrance surface E1 of the prism body 9a, is reflected by a reflective surface 8a, is incident at an angle of incidence of not less than the critical angle to a totally reflective surface 7a to be totally reflected, is then reflected by the optical path separator 4, is incident at an angle of incidence of not more than the critical angle to the totally reflective surface 7a to pass through a transmissive surface E2, and is guided to the eyeball 1. As described, the display optical system reflects the light beam from the LCD 2 twice or three times and guides it to the eyeball 1 without imaging. This permits the observer to observe the image information displayed on the LCD 2.

The image-pickup optical system 102 is constructed so that the light from the outside is incident into an entrance surface E3 of the prism body 9c (a part of totally reflective surface 7c), is then reflected by the optical path separator 4, is incident at an angle of incidence of not less than the critical angle to be totally reflected, is emergent from an exit surface E4 of the prism body 9c, and thereafter passes through the stop 5 and optical system 6 to form an image on the image pickup device (CCD) 3. This permits the device to record the image information of the outside.

The seethrough optical system 103 of the present embodiment is constructed so that the light from the outside is incident to the entrance surface E3 of the prism body 9c of the image-pickup optical system 102, passes through the optical path separator 4 (half mirror), is incident at an angle of incidence of not more than the critical angle to the exit surface E2 of the prism body 9a of the display optical system 101 to pass through the exit surface E2, and is then guided to the eyeball 1. This permits the observer to observe the image information of the outside.

In the present embodiment the polarizing plate PP is located near the position of the stop 5 of the image-pickup optical system 102, i.e., near the position of the pupil. The polarization axis of this polarizing plate PP is arranged to be perpendicular to the polarization axis of the linearly polarized light from the LCD 2.

This prevents the light emitted from the LCD 2 and passing through the optical path separator 4 and through the prism body 9c from being incident onto the surface of CCD 3 via the optical system 6 and in turn causing flare (noise), which maintains the optical characteristics of the image information of the outside obtained by the CCD 3, in good order.

In the present embodiment the totally reflective surface 7a and exit surface E2 of the prism body 9a are constructed of a common curved surface, which is used in the different ways depending upon the conditions of incidence of the light beam. Further, the entrance surface E3 and totally reflective surface 7c of the prism body 9c are also constructed of a common curved surface, which is used in the different ways depending upon the conditions of incidence of the light beam, as in the prism body 9a. The same is also applied to each of the embodiments below.

In the present embodiment the display optical system 101 and the image-pickup optical system 102 are opposed to each other at the optical path separator 4, so that the outside optic axis 1c (the optic axis 102a of the image-pickup optical system 102) of the light beam incident from the outside to the image-pickup optical system 102 substantially agrees with the eyeball optic axis 1a of the light beam incident to the eyeball 1 or with the virtual eyeball optic axis 1b as an extension of the eyeball optic axis 1a; this permits concurrent observation and image pickup without parallax, including observation of the image information displayed on the LCD 2, imaging of the image information of the outside on the surface of the image pickup device (CCD) 3, and observation of the image information of the outside (through the seethrough optical system).

Features of the present embodiment will be described next. The display optical system 101 and the image-pickup optical system 102 both have the plurality of reflective surfaces, and the plurality of reflective surfaces reflect the light from the LCD 2 and the light from the outside to alternately fold the light in the opposite directions along the direction of the eyeball optic axis 1c and guide it to the eyeball 1 and to the image pickup device 3, thereby decreasing the thickness of the optical system having both the display optical system 101 and the image-pickup optical system 102.

For eliminating the parallax, the outside optic axis 1c of the outside and the eyeball optic axis 1a are set substantially on a straight line, whereby on the occasion of observing the information from the image pickup device 3 as being displayed on the LCD 2 of the display optical system 101, the observer can observe the image without parallax in the direction in which the observer now faces.

Further, with the seethrough optical system 103 for guiding the light from the outside through the optical path separator 4 to the eyeball 1 so as to permit the observer to observe the outside, information according to circumstances of the outside is displayed through the display optical system 101 on the image of the outside, whereby the superimposed information without parallax seems as if it is in the real world.

The plurality of reflective surfaces of the present optical system (the display optical system and the image-pickup optical system) are reflective surfaces being eccentric and having respective curvatures, and arrangement of the reflective surfaces becomes free by decentration of the plurality of reflective surfaces, whereby the present optical system can be made thinner. When the reflective surfaces are not flat but are curved, it becomes possible to eliminate an unnecessary, reflective surface or lens.

The plurality of reflective surfaces being eccentric and having respective curvatures are surfaces with refractive powers varying depending upon the azimuth angles about the vertex of surface (which will be referred to as free curved surfaces, each free curved surface being defined by a functional equation and the vertex of surface being defined at the origin of the function). A reflective surface being eccentric and having a curvature gives rise to rotationally asymmetric decentration aberration, and this decentration aberration cannot be suppressed by the ordinary, rotationally symmetric, spherical or aspherical surfaces. Then, the decentration aberration is suppressed by the free curved surfaces (rotationally asymmetric surfaces) with the refractive powers differing depending upon the azimuth angles about the vertex of surface.

In the present embodiment the light from the LCD 2 is incident to the display optical system 101, thereafter is reflected twice or three times to emerge from the display optical system 101, and is guided to the eyeball without imaging, thereby achieving miniaturization of the optical system.

In addition, each of the display optical system 101 and the image-pickup optical system 102 is made of the prism body having three or more, different, optical surfaces, including the totally reflective surface satisfying the critical condition. When this totally reflective surface also serves as a transmissive exit surface of the prism body, the surface transmits or reflects (totally reflects) light, depending upon the angle of incidence to the surface. A half mirror is normally used in order to provide a surface with the both actions of transmission and reflection, but a quantity of light is decreased thereby. In contrast with it, the present embodiment employs the totally reflective surface, so that the resultant image is bright without losses in the light quantity at all.

In the present embodiment the optical path separator 4 is comprised of one reflective surface being eccentric and having a curvature, the display optical system includes the reflective surface on one side of the aforementioned reflective surface, and the image-pickup optical system includes the reflective surface on the other side of the aforementioned reflective surface. Since the optical path separator 4 is comprised of the eccentric surface which is not flat but curved, the two optical systems exclude the unnecessary, reflective surface or lens and in addition, the optical paths are separated by the single surface; therefore, the optical apparatus is miniaturized in the total structure.

The reflective surface of the optical path separator 4 is the surface with the refractive powers varying depending upon the azimuth angles about the vertex of surface, thereby correcting the decentration aberration given rise to by the two optical systems.

In the present embodiment, the image-pickup optical system 102 for focusing the light from the outside on the image pickup device 3 is comprised of the plurality of reflective surfaces being eccentric and having the respective curvatures, whereby the light from the outside is folded alternately in the direction of the outside optic axis 1c and in the opposite direction, thereafter passes through the stop 5 of the image-pickup optical system 102, and thereafter is guided through the polarizing plate PP and the optical system 6 to the image pickup device 3. This use of the plurality of reflective surfaces being eccentric and having the respective curvatures permits the system to exclude the unnecessary, reflective surface and lens and to fold the rays alternately, thereby making the image-pickup optical system thinner.

There are the stop 5, the polarizing plate PP, and the optical system 6 disposed in the last part of the image-pickup optical system, whereby a better balance is achieved in the size between the front-part optical system including the plurality of reflective surfaces being eccentric and having the respective curvatures, and the optical system 6. Further, the diameter of the stop is decreased by giving a positive refractive power to the front-part optical system having the plurality of reflective surfaces being eccentric and having the respective curvatures.

Further, using the prism body 9c having the three or more, different, optical surfaces including the plurality of reflective surfaces being eccentric and having the respective curvatures, the stop 5 is located near the exit plane of the prism body 9c. When the plurality of reflective surfaces being eccentric and having the respective curvatures are the surfaces of the prism, the plurality of reflective surfaces can be made integrally and are easier to manufacture. In addition, the prism body 9c is downsized by placing the stop 5 near the exit plane of the prism body 9c.

Focus adjustment of the image-pickup optical system 102 is achieved by the optical system 6 after the stop surface 5. This makes the focus adjustment easier by use of the small optical system 6 after the stop surface 5.

In the present invention, a magnification of an image formed directly on the retina of the eyeball from the outside is approximately equal to a magnification of an image formed on the retina by capturing the information of the outside through the CCD 3 and displaying it on the LCD 2. This permits the optical apparatus without the seethrough system to regenerate such a feeling that the observer observes the information of the outside as if to see the outside though actually not seeing the outside. In the seethrough case, because the display on the LCD can be superimposed in the same size on the information of the outside through the seethrough system, for example, supposing the information captured by the CCD is one of infrared light, the observer can feel as if to also see the information that is not actually seen through the seethrough system.

The present embodiment may also be modified using an electrical processing circuit in such a manner that the polarizing plate PP is removed, the image information displayed on the LCD 2 is displayed in time division (for example, within the after image time of the eye, $\frac{1}{60}$ to $\frac{1}{30}$ sec), the recording time of the image information from the outside, recorded by the image pickup device 3, is shifted from the display time of the LCD 2, and the signal from the image pickup device 3 is used only at the time when the light beam from the LCD 2 is not incident to the image pickup device 3. This can also achieve the same effect as in the present embodiment.

Figure 9:
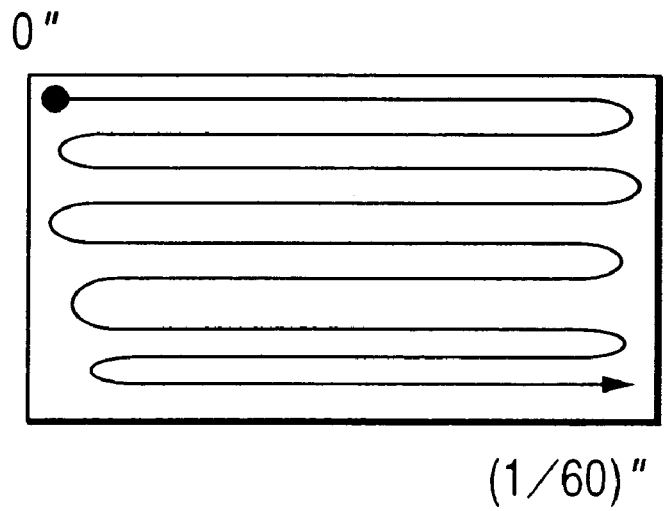
FIG. 9 is an explanatory drawing for explaining a display method of the display device according to the present invention.
Figure 10:
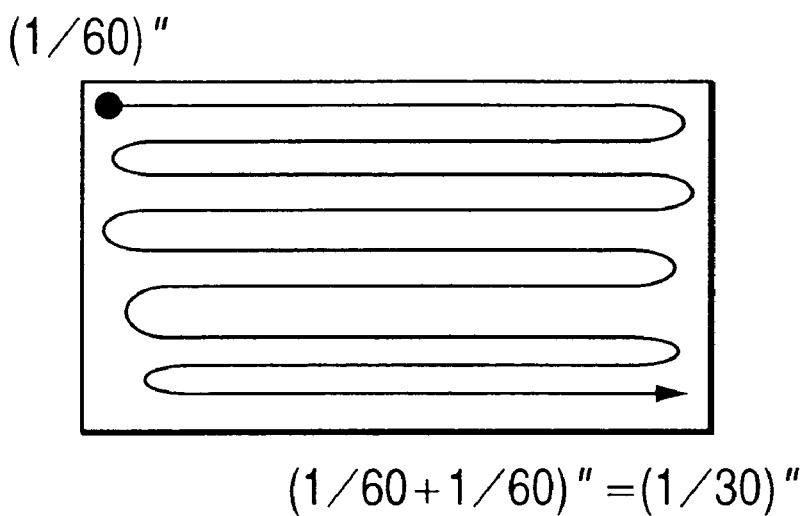
FIG. 10 is an explanatory drawing for explaining a way of display on the image pickup device surface in the CCD according to the present invention.

The observer can observe a dynamic picture by the after image effect in such a manner that the optical apparatus is constructed of the display optical system in the structure, for example, using the TN liquid crystal and illuminating it by white back light and the image-pickup optical system for forming the image of the outside on the CCD surface, one screen is scanned and formed in the time of $\frac{1}{60}$ sec on the surface of the LCD 2 shown as the display optical system in FIG. 9, then the image information of the outside is picked up in the time of 1/60 sec on the CCD 3 shown as the image-pickup optical system in FIG. 10, and images are displayed in time division in the period of 1/30 sec on the display device 2. The observation can be done by successively repeating the steps as described above.

Next described is another embodiment for preventing the light beam from the display device 2 from entering the CCD 3 through the optical path separator 4 in the present invention.

Figure 2:
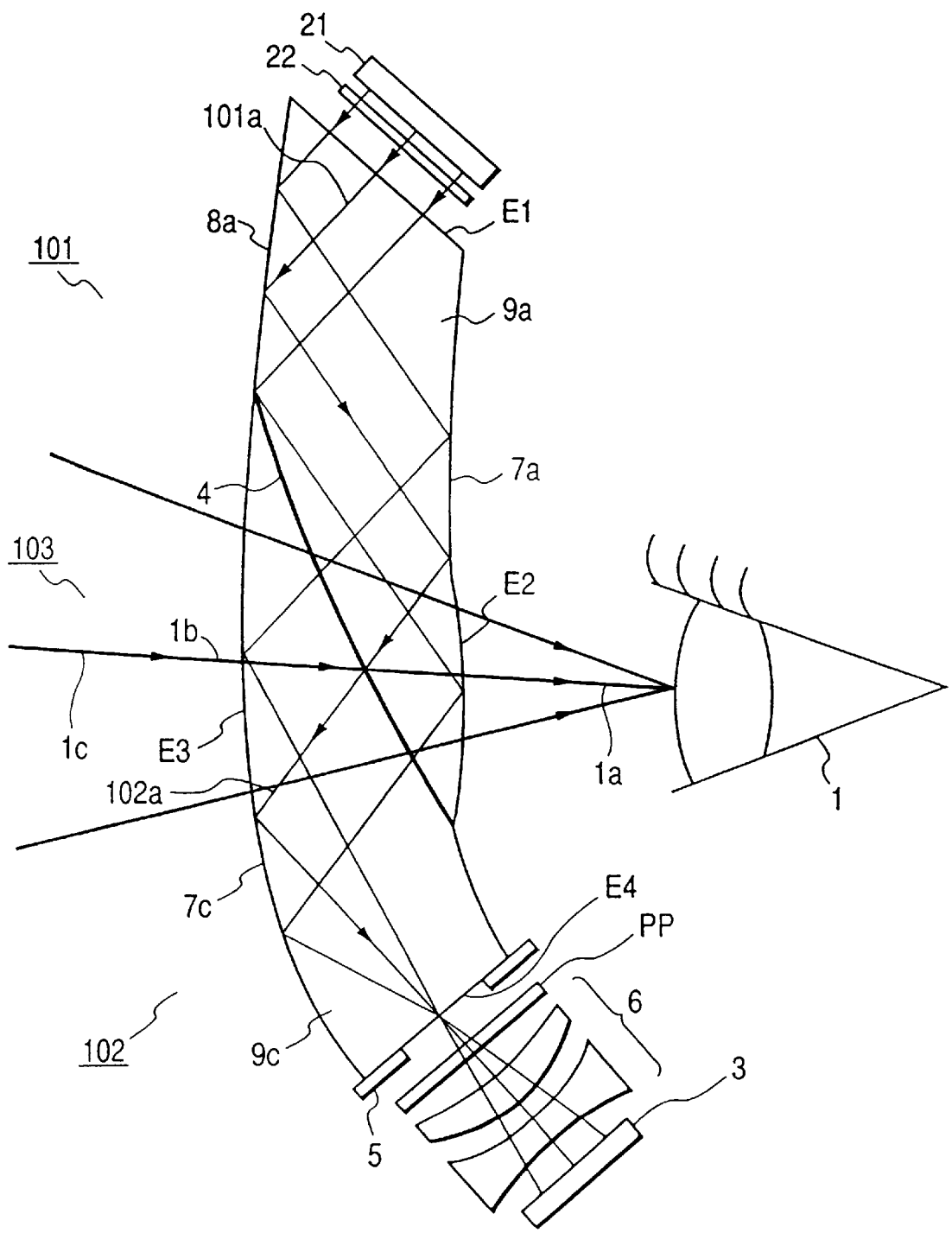
FIG. 2 is a major-part schematic diagram of Embodiment 2 of the present invention.

FIG. 2 is a schematic diagram of major part of Embodiment 2 according to the present invention. The present embodiment is different from Embodiment 1 of FIG. 1 in:

that a CRT or the like for emitting light in a non-polarized state is used as a display device 21 instead of the liquid crystal display LCD for emitting the light in a polarized state; and that a polarizing plate 22 is placed between the display device 21 and the prism body 9a so that the polarization axis thereof is perpendicular to the polarization axis of the polarizing plate PP. The other structure is the same as in Embodiment 1. Based on the above structure, the present embodiment achieves the same effect as Embodiment 1.

Figure 3:
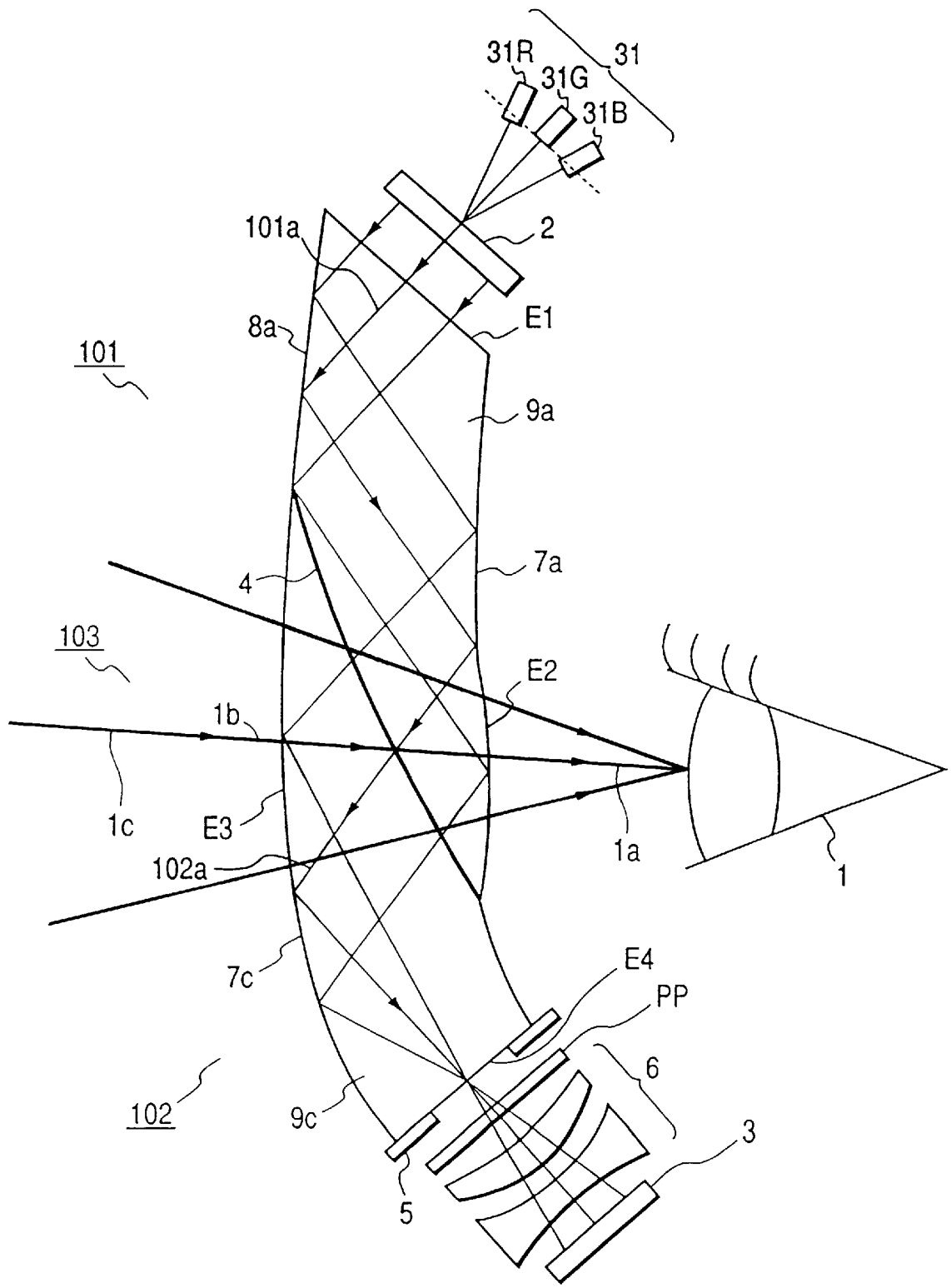
FIG. 3 is a major-part schematic diagram of Embodiment 3 of the present invention.

FIG. 3 is a schematic diagram of major part of Embodiment 3 according to the present invention. The present embodiment is different from Embodiment 1 of FIG. 1 in:

that a ferroelectric liquid crystal display, FLCD, is used as the display device 2 to display color image information in time division and three light sources 31R, 31G, 31B for emitting respective color light beams successively illuminate the display device in time division in synchronism with color image displays based on the respective color light beams; and that images of R, G, B displayed on the display device 2 are displayed within 1/60 to 1/30 sec in total by utilizing the after image effect of the eye. The other structure is the same as in Embodiment 1. The light sources 31R, 31G, 31B may be replaced by a combination of a white light source with a color filter.

Let us explain an example wherein the FLCD is used as the display device 2 and color images (R, G, B) of three tones are displayed in 1/60 sec.

As shown in FIGS. 11A to 11C, color images R, G, B of the first tone are successively displayed in time division each in 1/600 sec on the FLCD surface to display a color image of one tone in 3/600 sec.

Then color images R, G, B of the second tone and the third tone are displayed each in 3/600 sec on the FLCD surface in the same manner as the display of color image of the first tone.

Thus the color images of the three tones are displayed in 3/600×3≅1/67 sec in total. In this example the time of (1/60−1/67) sec is used as an adjustment time for transition to the next step.

In the image-pickup optical system the CCD 3 then picks up the image information of the outside in 1/60 sec. The apparatus may be so adapted that such display of color images by the display optical system and image pickup by the image-pickup optical system are successively performed in time division.

Since this example uses the pixels for each of R, G, B, it is brighter, higher in density, and thus higher in resolution than in the case using the color filter wherein three color pixels compose one pixel.

Figure 12A:
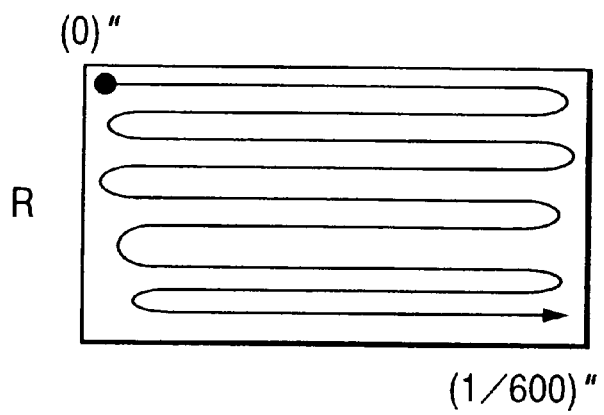
FIGS. 12A, 12B, and 12C are explanatory drawings for explaining a way of display on the image pickup device surface in the CCD according to the present invention.
Figure 12B:
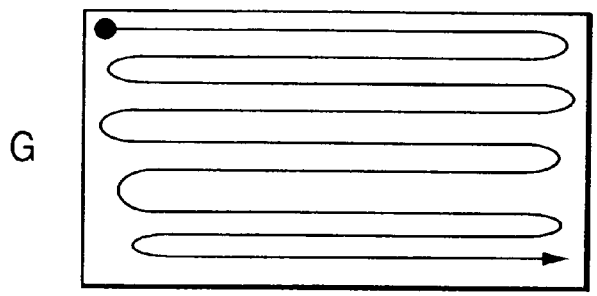
Figure 12C:
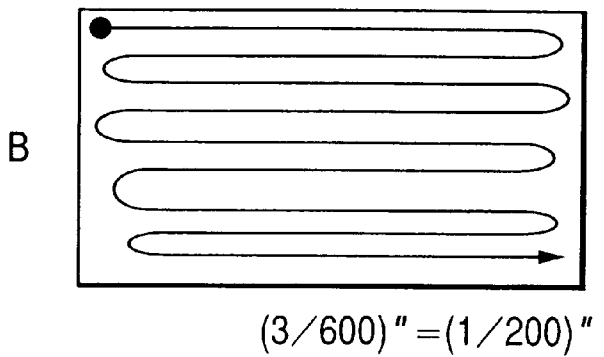

In the case wherein an anti-ferroelectric liquid crystal is used as the liquid crystal used in the display device 2 and wherein a color image of one tone is displayed, color images R, G, B are displayed in time division each in 1/600 sec as shown in FIGS. 12A to 12C, so that one color image is displayed in 3/600=1/200 sec.

Then the CCD 3 of the image-pickup optical system picks up the image information of the outside in 1/60 sec. The apparatus may be so adapted that such display of the color image by the display optical system and image pickup by the image-pickup optical system is performed successively in time division.

The time of the difference between 1/200 sec for display on the display device 2 and 1/60 sec, (1/60−1/200) sec, is used as an adjustment time for transition from the display on the display device 2 to the image pickup by the CCD 3, or for the reverse transition.

This permits the color image displayed on the display device 2 to be observed in a bright state and the image information of the outside to be imaged on the CCD 3. Further, the seethrough optical system 103 is used to observe the image information of the outside in a superimposed fashion on the image information displayed on the display device 2.

Figure 5:
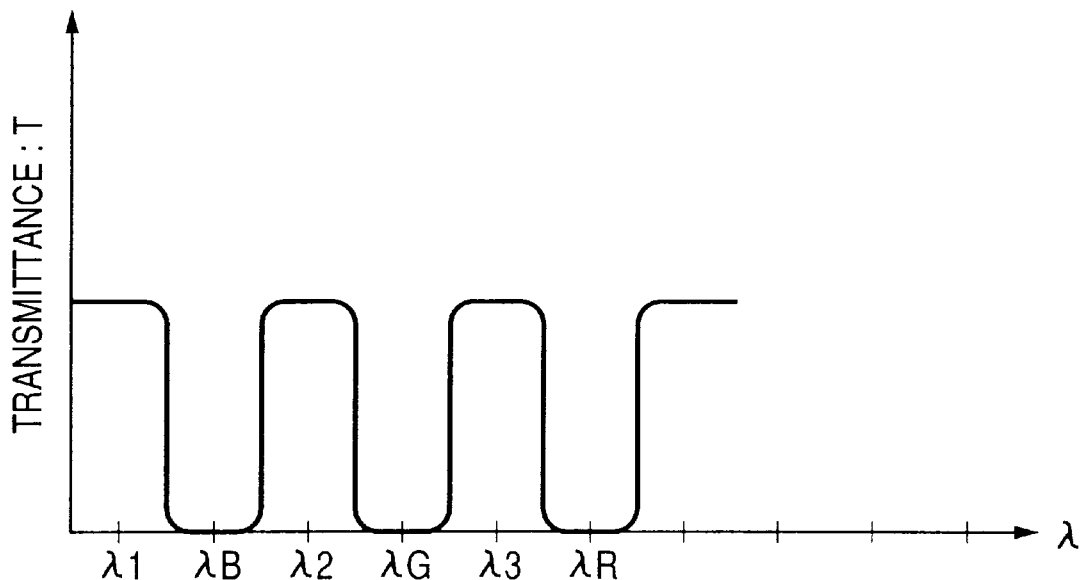
FIG. 5 is an explanatory drawing for explaining the spectral distribution of a color filter in Embodiments 3 and 4 of the present invention.

In the present embodiment three light-emitting diodes (LEDs) for emitting respective color light beams of R, G, and B may be used as the three light sources 31R, 31G, 31B to illuminate the liquid crystal display (LCD) 2 by the light beams from the LEDs, and a color filter CF having the spectral distribution as shown in FIG. 5 may be used instead of the polarizing plate PP.

In FIG. 5 wavelengths $\lambda B$, $\lambda G$, $\lambda R$ are wavelengths of emission spectra of the respective light-emitting diodes 31B, 31G, 31R.

The color filter CF has such spectral distribution as to intercept the light beams of predetermined wavelength bands around these wavelengths $\lambda B$, $\lambda G$, $\lambda R$ and as to transmit light beams of wavelength bands around the other wavelengths $\lambda 1$, $\lambda 2$, $\lambda 3$.

This color filter CF is constructed, for example, of a plurality of dichroic filters. This color filter CF prevents the respective color light beams from the LCD 2 from entering the CCD 3.

The color filter CF also intercepts part of color light from the image information of the outside, travelling to the CCD 3, so as to change the color balance of the image information, but it is compensated for by a subsequent signal processing circuit (not illustrated) to obtain a predetermined color image.

Figure 4:
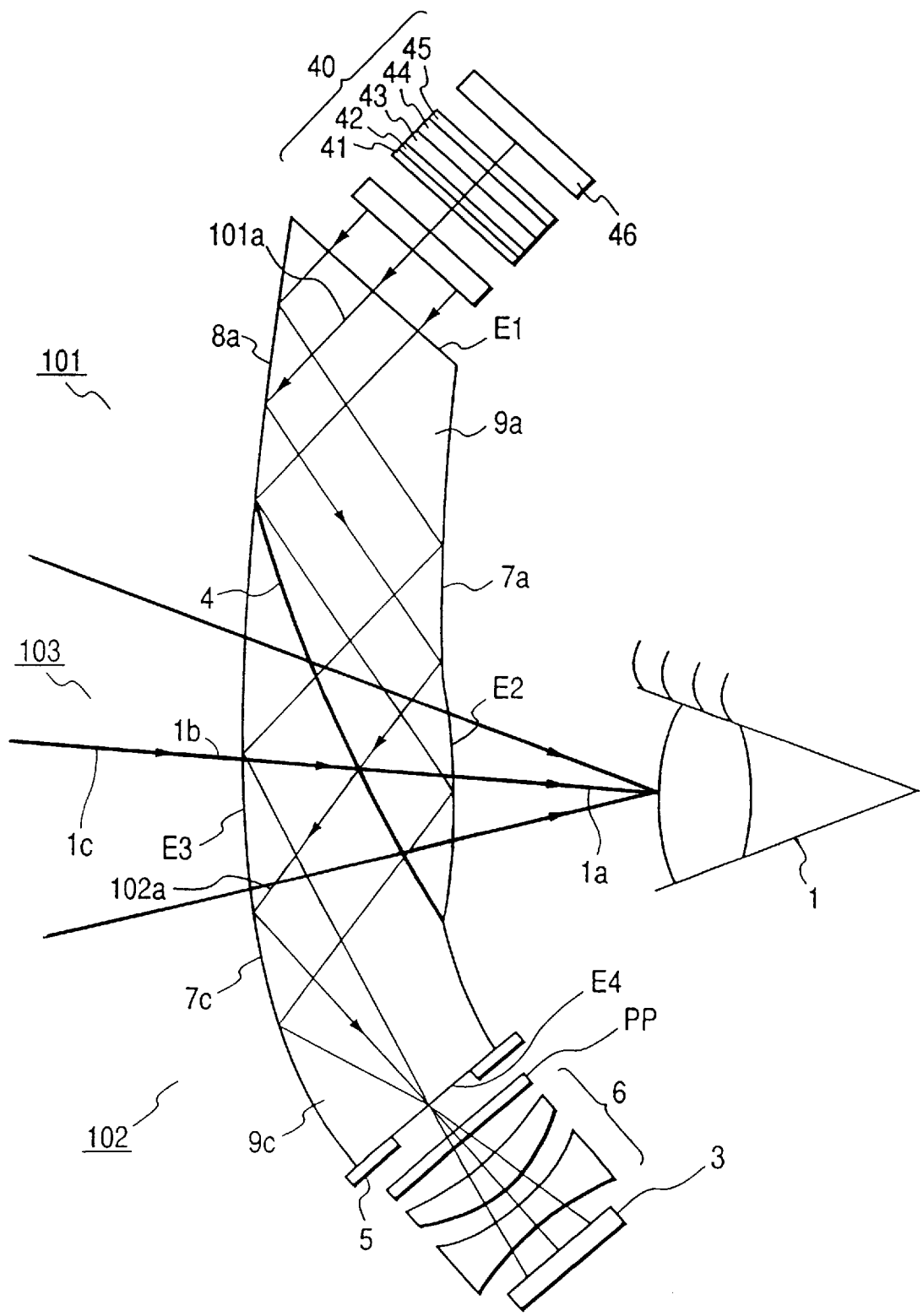
FIG. 4 is a major-part schematic diagram of Embodiment 4 of the present invention.

FIG. 4 is a schematic diagram of major part of Embodiment 4 according to the present invention. The present embodiment is different from Embodiment 1 of FIG. 1 in:

that a color liquid crystal display (color LCD) 40 for display of color image is used as a display device; and that the color LCD 40 is illuminated by back light 46. The other structure is the same as in Embodiment 1.

In FIG. 4 the color LCD 40 has a polarizing plate 41, a cover glass 42, a color filter 43 in which small filters of R, G, and B are arranged two-dimensionally at predetermined pitch, a liquid crystal device 44, and a polarizing plate 45.

The color image information (pixels) displayed in the liquid crystal device 44 is illuminated through the polarizing plate 45 by the light beam (white light) from the back light 46, whereby a light beam from each pixel is made emergent through the color filter 43 and polarizing plate 41.

Here, the polarization axis of polarized light emerging from the color LCD 40 is perpendicular to that of the polarizing plate PP. This permits the present embodiment to achieve the same effect as Embodiment 1.

The present embodiment may be modified so that the polarizing plate PP is replaced by the color filter CF having the spectral distribution as shown in FIG. 5.

In FIG. 5 the wavelengths λB, λG, λR are transmission center wavelengths of the color filter 43. The color filter CF used instead of the polarizing plate PP has such spectral distribution as to intercept the light beams of the predetermined wavelength bands around these wavelengths λB, λG, λR and as to transmit the light beams of the wavelength bands around the other wavelengths λ1, λ2, λ3.

This color filter CF is constructed, for example, of a plurality of dichroic filters. This color filter CF prevents the respective color light beams from the color LCD 40 from entering the CCD 3.

The color filter CF also intercepts part of the color light from the image information of the outside, travelling to the CCD 3, so as to change the color balance of the image information, but it is compensated for by a subsequent signal processing circuit (not illustrated) to obtain a predetermined color image.

Described below are other embodiments of the display optical system 101, the image-pickup optical system 102, and the seethrough optical system 103 according to the present invention.

Figure 6:
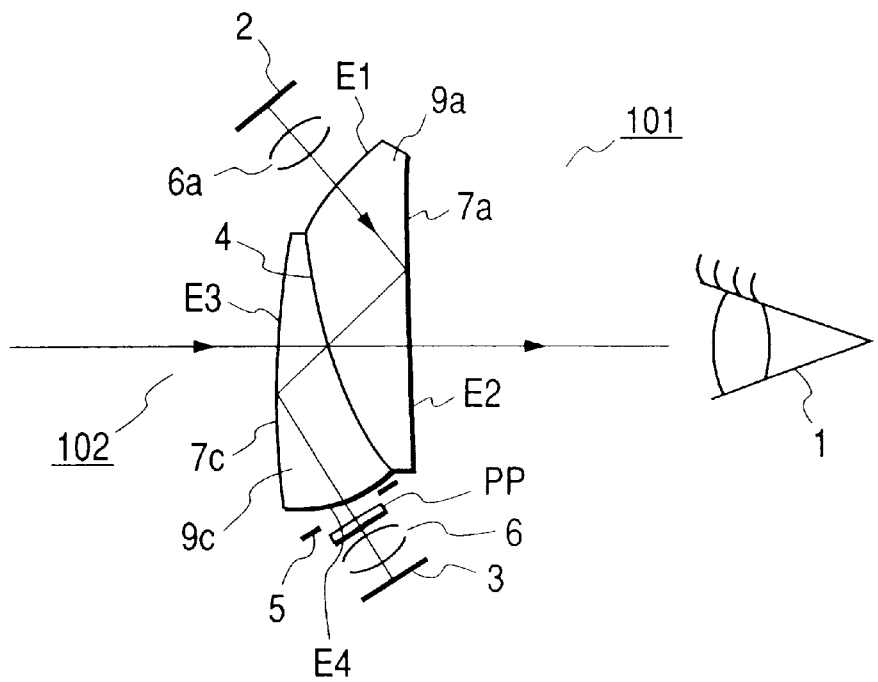
FIG. 6 is a major-part schematic diagram of Embodiment 5 of the present invention.

FIG. 6 to FIG. 8 are schematic diagrams of major part of Embodiments 5 to 7 according to the present invention. The structure of the polarizing plate PP, color filter CF, display device 2, etc. shown in FIG. 2 to FIG. 5 can also be applied similarly to each Embodiment 5 to 7.

In FIG. 6 to FIG. 8 the same elements as those shown in FIG. 1 are denoted by the same reference symbols. Each embodiment will be described below.

In Embodiment 5 of FIG. 6, the light from the liquid crystal display (LCD) 2 of the display optical system 101 is incident through an optical system 6a into the entrance surface E1 of the prism body 9a, thereafter is totally reflected by the totally reflective surface 7a, is reflected by the optical path separator 4, is emergent from the exit surface E2 of the prism body 9a, and then is incident to the eyeball 1. In the image-pickup optical system 102 the light from the outside is incident into the entrance surface E3 of the prism body 9c, thereafter is reflected by the optical path separator 4, is totally reflected by the totally reflective surface 7c, is emergent from the exit surface E4 of the prism body 9c, passes through the stop 5 and polarizing plate PP, and then is focused on the surface of the CCD 3 by the optical system 6. The path of the light through the seethrough optical system is arranged in the same route as in FIG. 1.

The present embodiment may be constructed without the optical system 6a disposed between the LCD 2 and the prism body 9a.

Embodiment 6 of FIG. 7 is different from Embodiments 1 to 5 of FIG. 1 to FIG. 4, and FIG. 6, described above, in that, though each of the display optical system 101 and image-pickup optical system 102 is constructed of a prism body, the two optical systems have respective optical path separators (8a, 4) independent of each other. The other basic structure of Embodiment 6 is the same as in the other embodiments. Embodiment 6 uses the optical systems independent of each other to achieve good optical performance with the small number of optical surfaces in each system.

In Embodiment 6 of FIG. 7 the paths of light through the display optical system 101 and through the image-pickup optical system 102 are the same as in Embodiment 5 of FIG. 6. Embodiment 6 is, however, different in that a joint member 10 is provided between the prism bodies 9a, 9c of the two optical systems 101, 102. The joint member 10 is comprised of an adhesive or a joint lens or the like. In this case the seethrough optical system can be established by matching the refractive indices of materials for the two prism bodies 9a, 9c and for the joint member 10 with each other and making the optical path separator 4 of the image-pickup optical system 102 and the reflective surface 8a of the display optical system 101 each of a half mirror. The optical path of the seethrough optical system is arranged so that the light from the outside is incident to the entrance surface E3 of the prism body 9c, passes through the optical path separator 4 (half mirror), through the joint member 10, and through the reflective surface 8a of the prism body 9a of the display optical system 101, is incident at an angle of incidence of not more than the critical angle into the exit surface E2, and then is incident to the eyeball 1.

In Embodiment 7 of FIG. 8, each optical element is constructed of a thin, reflective plate 12-1 to 12-3 having a curvature. In this case, the seethrough optical system demonstrates little degradation of optical performance, thus achieving good optical performance.

In Embodiment 7 of FIG. 8 one surface of the optical path separator 4 is a reflective surface, the display optical system 101 uses the reflective surface 4 on one side, and the light through the image-pickup optical system 102 is reflected by the reflective surface 4 on the other side. For also establishing the seethrough optical system, the reflective surface of the optical path separator 4 is constructed of a half mirror.

The light from the LCD 2 of the display optical system 101 passes through the lens 6a, is reflected by the reflective surface 8a of the reflective plate 12-1, is reflected by the optical path separator 4 of the reflective plate 12-2, and passes through the reflective plate 12-1 to enter the eyeball 1. The light from the outside of the image-pickup optical system 102 passes through the reflective plate 12-3, is then reflected by the optical path separator 4 of the reflective plate 12-2, is reflected by the reflective surface 8c of the reflective plate 12-3, passes through the stop 5 and polarizing plate PP, and then is focused on the CCD 3 by the optical system 6. The light through the seethrough optical system passes through the reflective plate 12-3 of the image-pickup optical system 102, passes through the optical path separator 4 (half mirror), and passes through the reflective plate 12-1 of the display optical system 101 to be guided to the eyeball 1.

As described above, the present invention achieves the composite display apparatus that permits the observer to observe the image information of the two optical systems in a good state while being downsized in the entire apparatus, by properly setting the structure of the display optical system including the prism body having the plurality of eccentric, reflective surfaces for guiding the light beam from the display device to the eyeball of the observer on the occasion of observation of the image information displayed on the display device such as the liquid crystal display and the structure of the image-pickup optical system for imaging the image information of the outside on the surface of the image pickup device such as the CCD.

What is claimed is:

1. A composite display apparatus comprising:
    a display optical system for guiding a light beam from display means displaying image information, to an eyeball of an observer;
    an image-pickup optical system for focusing a light beam from the outside on an image pickup device;
    optical path separating means provided in an optical path;
    wherein said optical path separating means is arranged to substantially align an eyeball optic axis of the light beam incident from the display optical system to the eyeball of the observer or a virtual eyeball optic axis as an extension on the outside of the eyeball optic axis with an outside optic axis of the light beam incident from the outside of the image-pickup optical system; and shield means for preventing the light beam from the display means from entering the image pickup device.

2. A composite display apparatus comprising:

a display optical system having a plurality of reflective surfaces, said display optical system being adapted to guide a light beam from display means displaying image information, to an eyeball of an observer;

an image-pickup optical system having a plurality of reflective surfaces, said image-pickup optical system being adapted to focus a light beam from the outside on an image pickup device;

optical path separating means provided in an optical path;

wherein said optical path separating means is arranged to substantially align an eyeball optic axis of the light beam incident from the display optical system to the eyeball of the observer or a virtual eyeball optic axis as an extension on the outside of the eyeball optic axis with an outside optic axis of the light beam incident from the outside of the image-pickup optical system; and shield means for preventing the light beam from the display means from entering the image pickup device.

3. A composite display apparatus according to claim 1 or 2, wherein said optical path separating means is comprised of a reflective surface or a half mirror surface being decenterd and having a curvature.

4. A composite display apparatus according to claim 1 or 2, wherein said display means is comprised of a liquid crystal display (LCD) and wherein said shield means is comprised of a polarizing plate, which is provided in front of said image pickup device.

5. A composite display apparatus according to claim 1 or 2, wherein said display means displays color image information and said display means is illuminated on a time-division basis by a plurality of color light beams from respective light sources.

6. A composite display apparatus according to claim 5, wherein said shield means is comprised of a color filter that does not transmit said plurality of color light beams from the respective light sources but transmits other color light beams.

7. A composite display apparatus according to claim 1 or 2, wherein said display means is comprised of a color liquid crystal display (LCD) and said color liquid crystal display is illuminated by white back light.

8. A composite display apparatus according to claim 7, wherein said shield means is comprised of a color filter that does not transmit a plurality of color light beams from said color liquid crystal display but transmits other color light beams.

9. A composite display apparatus according to claim 1 or 2, wherein said image-pickup optical system and said display optical system are systems whose optical paths are separated in opposite directions by the optical path separating means, said display optical system comprises a reflective surface on one side of a reflective surface of said optical path separating means, and the image-pickup optical system comprises a reflective surface on the other side of the reflective surface of the optical path separating means.

10. A composite display apparatus according to claim 1 or 2, wherein said optical path separating means is comprised of a surface having transmitting action and reflecting action, and wherein a seethrough optical system for observation of image information of the outside is established in such a manner that the light beam from the outside passes through a part of said image-pickup optical system, passes through the optical path separating means, and passes through a part of said display optical system to be guided to the eyeball of the observer.

11. A composite display apparatus comprising:

a display optical system for guiding a light beam from display means displaying image information, to an eyeball of an observer;

an image-pickup optical system for focusing a light beam from the outside on an image pickup device; and optical path separating means provided in an optical path;

wherein said optical path separating means is arranged to substantially align an eyeball optic axis of the light beam incident from the display optical system to the eyeball of the observer or a virtual eyeball optic axis as an extension on the outside of the eyeball optic axis with an outside optic axis of the light beam incident from the outside of the image-pickup optical system, wherein said display means displays the image information on a time-division basis, and wherein said image pickup device records image information from the outside only during a period in which said display means does not display the image information.

12. A composite display apparatus comprising:

a display optical system having a plurality of reflective surfaces, said display optical system being adapted to guide a light beam from display means displaying image information, to an eyeball of an observer;

an image-pickup optical system having a plurality of reflective surfaces, said image-pickup optical system being adapted to focus a light beam from the outside on an image pickup device; and optical path separating means provided in an optical path;

wherein said optical path separating means is arranged to substantially align an eyeball optic axis of the light beam incident from the display optical system to the eyeball of the observer or a virtual eyeball optic axis as an extension on the outside of the eyeball optic axis with an outside optic axis of the light beam incident from the outside of the image-pickup optical system, wherein said display means displays the image information on a time-division basis, and wherein said image pickup device records image information from the outside only during a period in which said display means does not display the image information.

13. A composite display apparatus according to claim 11 or 12, wherein said optical path separating means is comprised of a reflective surface or a half mirror surface being decentered and having a curvature.

14. A composite display apparatus according to claim 11 or 12, wherein said display means displays color image information and said display means is illuminated on a time-division basis by a plurality of color light beams from respective light sources.

15. A composite display apparatus according to claim 11 or 12, wherein said display means is comprised of a color liquid crystal display (LCD) and said color liquid crystal display is illuminated by white back light.

16. A composite display apparatus according to claim 11 or 12, wherein said image-pickup optical system and said display optical system are systems whose optical paths are separated in opposite directions by the optical path separating means, said display optical system comprises a reflective surface on one side of a reflective surface of said optical path separating means, and the image-pickup optical system comprises a reflective surface on the other side of the reflective surface of the optical path separating means.

17. A composite display apparatus according to claim 11 or 12, wherein said optical path separating means is comprised of a surface having transmitting action and reflecting action, and wherein a seethrough optical system for observation of image information of the outside is established in such a manner that the light beam from the outside passes through a part of said image-pickup optical system, passes through the optical path separating means, and passes through a part of said display optical system to be guided to the eyeball of the observer.

* * * * *

UNITED STATES PATENT AND TRADEMARK OFFICE
CERTIFICATE OF CORRECTION

PATENT NO. : 6,094,241

DATED : July 25, 2000

INVENTOR(S) : Shoichi Yamazaki

It is certified that error appears in the above-identified patent and that said Letters Patent is hereby corrected as shown below:

ABSTRACT [57]
    Line 4, "seethrough" should read --see-through--.

COLUMN 1
    Line 25, "seethrough" should read --see-through--.
    Line 48, "seethrough" should read --see-through--.
    Line 51, "seethrough" should read --see-through--.

COLUMN 2
    Line 9, "seethrough" should read --see-through--.

COLUMN 3
    Line 25, "seethrough" should read --see-through--.

COLUMN 5
    Line 6, "seethrough" should read --see-through--.
    Line 18, "seethrough" should read --see-through--.
    Line 23, "seethrough" should read --see-through--.
    Line 58, "seethrough" should read --see-through--.

COLUMN 6
    Line 38, "seethrough" should read --see-through--.
    Line 57, "seethrough" should read --see-through--.

UNITED STATES PATENT AND TRADEMARK OFFICE
CERTIFICATE OF CORRECTION

PATENT NO. : 6,094,241

DATED : July 25, 2000

INVENTOR(S) : Shoichi Yamazaki

It is certified that error appears in the above-identified patent and that said Letters Patent is hereby corrected as shown below:

COLUMN 8
```
    Line 37, "seethrough" should read --see-through--.
    Line 41, "seethrough" should read --see-through--.
    Line 43, "seethrough" should read --see-through--.
    Line 46, "seethrough" should read --see-through--.
```

COLUMN 10
```
    Line 20, "seethrough" should read --see-through--.
    Line 55, "The" should read --¶ The--.
    Line 56, Close up right margin.
```

COLUMN 11
```
    Line 25, "seethrough" should read --see-through--.
    Line 49, "seethrough" should read --see-through--.
```

COLUMN 12
```
    Line 4,  "seethrough" should read --see-through--.
    Line 9,  "seethrough" should read --see-through--.
    Line 19, "seethrough" should read --see-through--.
    Line 26, "seethrough" should read --see-through--.
    Line 39, "seethrough" should read --see-through--.
```

UNITED STATES PATENT AND TRADEMARK OFFICE
CERTIFICATE OF CORRECTION

PATENT NO. : 6,094,241

DATED : July 25, 2000

INVENTOR(S) : Shoichi Yamazaki

It is certified that error appears in the above-identified patent and that said Letters Patent is hereby corrected as shown below:

COLUMN 13
  Line 32, "decenterd" should read --decentered--.

COLUMN 14
  Line 6, "seethrough" should read --see-through--.

COLUMN 16
  Line 4, "seethrough" should read --see-through--.

Signed and Sealed this

Eighth Day of May, 2001

Attest:

NICHOLAS P. GODICI

Attesting Officer

Acting Director of the United States Patent and Trademark Office